United States Patent
Tsai et al.

(10) Patent No.: US 8,390,664 B2
(45) Date of Patent: Mar. 5, 2013

(54) HAND-HELD ELECTRICAL COMMUNICATION DEVICE AND IMAGE PROCESSING METHOD THEREOF

(75) Inventors: Chung-Ching Tsai, Baoshan Township, Hsinchu County (TW); Han-Min Cheng, Jhubei (TW)

(73) Assignee: Alpha Imaging Technology Corp., Hsinchu County (TW)

( * ) Notice: Subject to any disclaimer, the term of this patent is extended or adjusted under 35 U.S.C. 154(b) by 679 days.

(21) Appl. No.: 12/503,733

(22) Filed: Jul. 15, 2009

(65) Prior Publication Data
US 2010/0014006 A1    Jan. 21, 2010

(30) Foreign Application Priority Data
Jul. 15, 2008  (TW) ................................ 97126851 A

(51) Int. Cl.
*H04M 11/00*    (2006.01)
(52) U.S. Cl. .................................. 348/14.01; 455/550.1
(58) Field of Classification Search ................ 455/556.1, 455/556.2, 3.6; 348/14.08–14.08
See application file for complete search history.

(56) References Cited

U.S. PATENT DOCUMENTS

| | | | |
|---|---|---|---|
| 2005/0130703 A1* | 6/2005 | Min et al. | 455/556.1 |
| 2007/0080736 A1 | 4/2007 | Castaneda et al. | |
| 2009/0064263 A1* | 3/2009 | Lee | 725/131 |
| 2010/0011128 A1* | 1/2010 | Paycher et al. | 710/1 |

* cited by examiner

Primary Examiner — Curtis Kuntz
Assistant Examiner — Maria El-Zoobi
(74) Attorney, Agent, or Firm — Rabin & Berdo, P.C.

(57) ABSTRACT

A hand-held electrical communication device including an image sensing unit, a mobile TV receiver, an image signal processing unit, a display unit and a baseband processing unit is provided. The image sensing unit generates an original image frame. The mobile TV receiver receives a compressed video data. The image signal processing unit adjusts the original image frame to be an adjusted image frame or decompresses the compressed video data into a video image frame, and respectively scales the adjusted image frame or the video image frame to be a scaled image frame. The baseband processing unit displays the scaled image frame on the display unit.

5 Claims, 3 Drawing Sheets

HAND-HELD ELECTRICAL COMMUNICATION DEVICE AND IMAGE PROCESSING METHOD THEREOF

This application claims the benefit of Taiwan application Serial No. 97126851, filed Jul. 15, 2008, the subject matter of which is incorporated herein by reference.

BACKGROUND OF THE INVENTION

1. Field of the Invention

The invention relates in general to a hand-held electrical communication device and an image processing method, and more particularly to a hand-held electrical communication device with powerful functions but simple architecture and an image processing method thereof.

2. Description of the Related Art

Referring to FIG. 1, a conventional mobile phone is shown. The mobile phone 100 includes an optical sensor 110, an image signal processing chip 120, a baseband chip 130 and a liquid crystal panel 140. The optical sensor 110 is coupled to the image signal processing chip 120 via a Consultative Committee of International Radio (CCIR) bus. The image signal processing chip 120 is coupled to the baseband chip 130 via another CCIR bus. All CCIR buses are uni-directional. The optical sensor 110 generates many original image frames being raw image frames. The optical sensor 110 transmits the original image frames to the image signal processing chip 120.

Referring to FIG. 2, a block diagram of a conventional image signal processing chip is shown. The image signal processing chip 120 includes a CCIR receiver 121, an image processing engine 122, a scaling engine 123 and a CCIR transmitter 124. The image signal processing chip 120 receives many original image frames from the optical sensor 110 via the CCIR receiver 121. The image processing engine 122 executes the original image frames image processing functions such as automatic exposure, automatic white balance or automatic focusing so to obtain many adjusted image frames. The scaling engine 123 scales the adjusted image frames so to obtain many scaled image frames according to the resolution of the liquid crystal panel 150. The CCIR transmitter 124 outputs the scaled image frames to the baseband chip 130. The baseband chip 130 displays the scaled image frames on the liquid crystal panel 140.

As the functions of the mobile phone 100 are getting more and more versatile, the mobile TV has become one of the appended functions of the mobile phone 100. Referring to FIG. 3, another example of the conventional mobile phone is shown. The mobile phone 300 includes an optical sensor 310, an image signal processing chip 320, a baseband chip 330, a liquid crystal panel 340 and a mobile TV receiver 350. The mobile phone 300 uses the mobile TV receiver 350 for receiving many compressed video data and many compressed audio data. Then, the mobile TV receiver 350 transmits the compressed video data and audio data to the baseband chip 330. The baseband chip 350 decompresses the compressed video data and video data, and then respectively transmits the decompressed video and audio data to the liquid crystal panel 340 or an audio device (not illustrated in the diagram).

Also, an external memory interface (EMI) can be used for loading an extra circuit on the baseband chip to provide the mobile TV function. Referring to FIG. 4, yet another example of the conventional mobile phone is shown. The mobile phone 400 includes an optical sensor 410, an image signal processing chip 420, a baseband chip 430, a liquid crystal panel 440, a mobile TV receiver 450 and an application processor 460. Compared with mobile phone 300, the mobile phone 400 uses the mobile TV receiver 450 for receiving many compressed video data and many compressed video data. Then, the mobile TV receiver 450 transmits these compressed video data and audio data to the application processor 460 loaded on baseband chip 430. The application processor 460 decompresses these compressed video data and audio data, and then respectively transmits the decompressed video and audio data to the liquid crystal panel 440 or an audio device (not illustrated in the diagram).

However, both the mobile phone 300 and the mobile phone 400, which respectively use a baseband chip 350 and an application processor 460 for decompressing the compressed video data and audio data, have to largely change the huge and complicated software architecture of the baseband chip, that is, the main-machine interface (MMI) of the baseband chip. Such change implies cost increase and is disadvantageous for the integration of the mobile phone and the mobile TV.

SUMMARY OF THE INVENTION

The invention is directed to a hand-held electrical communication device and an image processing method thereof. An image signal processing unit is used for decompressing the compressed video data and audio data of the mobile phone, so that the video image frame is displayed on the display unit without having to change the software architecture of the baseband processing unit.

According to a first aspect of the present invention, a hand-held electrical communication device is provided. The hand-held electrical communication device includes an image sensing unit, a mobile TV receiver, an image signal processing unit, a display unit, a baseband processing unit, a first bus and a second bus. The image sensing unit generates an original image frame. The mobile TV receiver receives a compressed video data. The image signal processing unit adjusts the original image frame to be an adjusted image frame or decompresses the compressed video data into a video image frame, and respectively scales the adjusted image frame or the video image frame to be a scaled image frame. The baseband processing unit displays the scaled image frame on the display unit. The mobile TV receiver outputs the compressed video data to the image signal processing unit via the first bus, and the image signal processing unit outputs the scaled image frame to the baseband processing unit via the second bus.

According to a second aspect of the present invention, an image processing method of a hand-held electrical communication device is provided. The hand-held electrical communication device includes an image sensing unit, a mobile TV receiver, an image signal processing unit, a display unit and a baseband processing unit. The image processing method includes the following steps. Firstly, the image sensing unit generates an original image frame. Next, the mobile TV receiver receives a compressed video data. Then, the image signal processing unit adjusts the original image frame to be an adjusted image frame or decompresses the compressed video data into a video image frame, and respectively scales the adjusted image frame or the video image frame to be a scaled image frame. Lastly, the baseband processing unit displays the scaled image frame on the display unit.

The invention will become apparent from the following detailed description of the preferred but non-limiting embodiments. The following description is made with reference to the accompanying drawings.

DETAILED DESCRIPTION OF THE INVENTION

The invention provides a hand-held electrical communication device and an image processing method thereof. The image signal processing unit, being equipped with a video decoder and an audio decoder, decompresses the compressed video data and the compressed audio data of a mobile TV, so that the video image frame can be displayed on the display unit without having to change the software architecture of the baseband processing unit.

Figure 1:
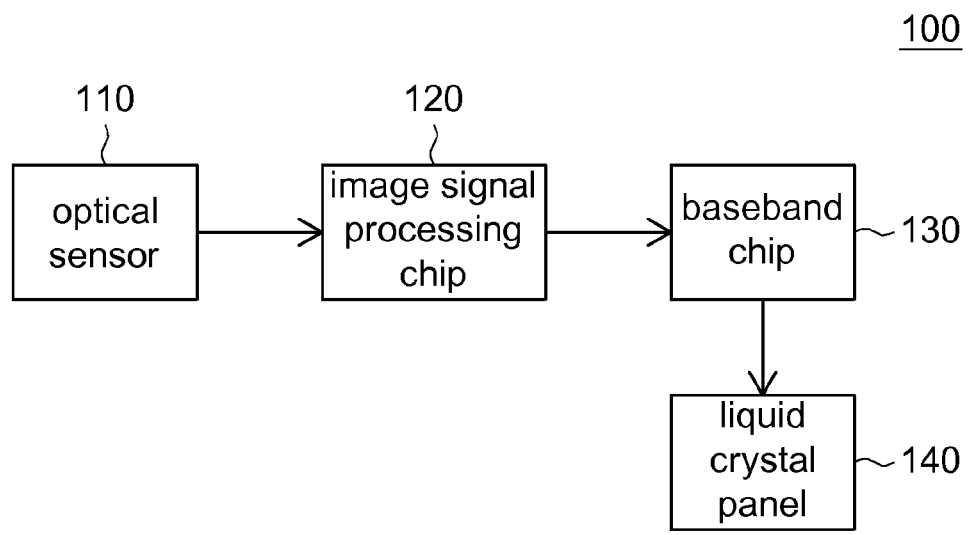
FIG. 1 (Prior Art) shows a conventional mobile phone.
Figure 2:
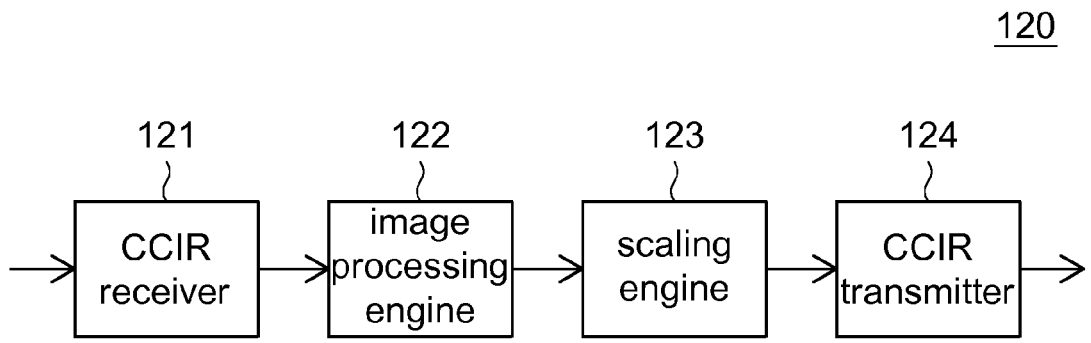
FIG. 2 (Prior Art) shows a block diagram of a conventional image signal processing chip.
Figure 3:
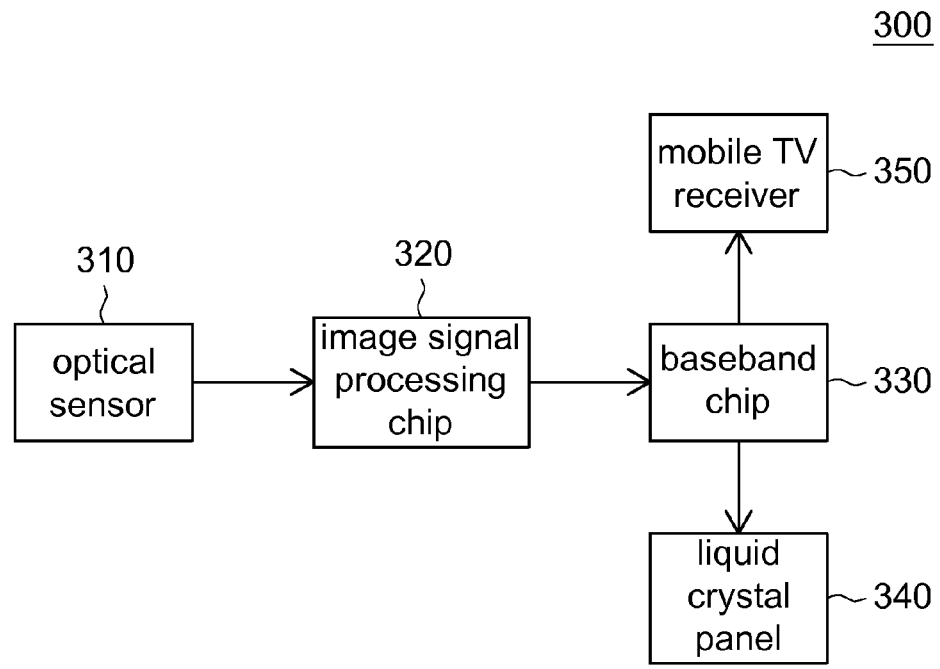
FIG. 3 (Prior Art) shows another example of the conventional mobile phone.
Figure 4:
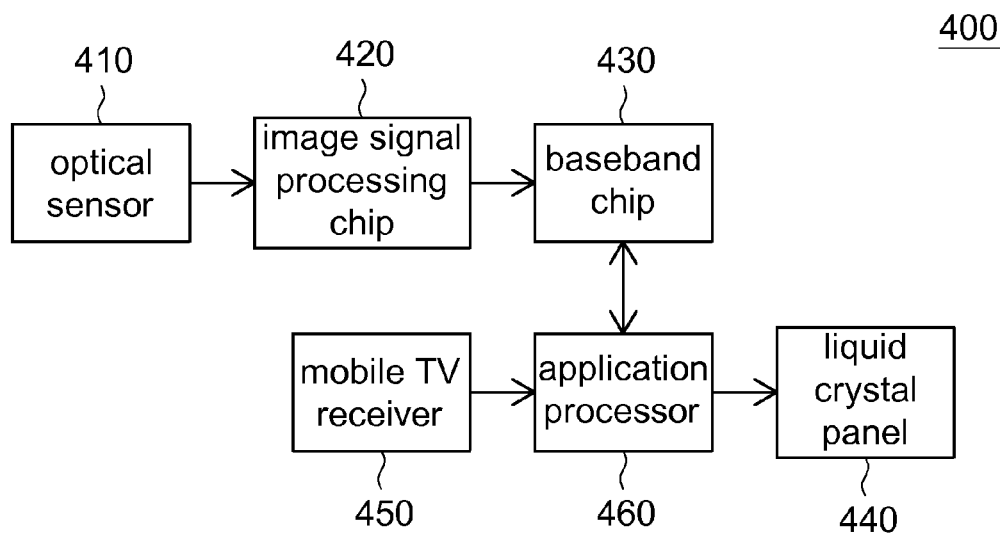
FIG. 4 (Prior Art) shows yet another example of the conventional mobile phone.
Figure 5:
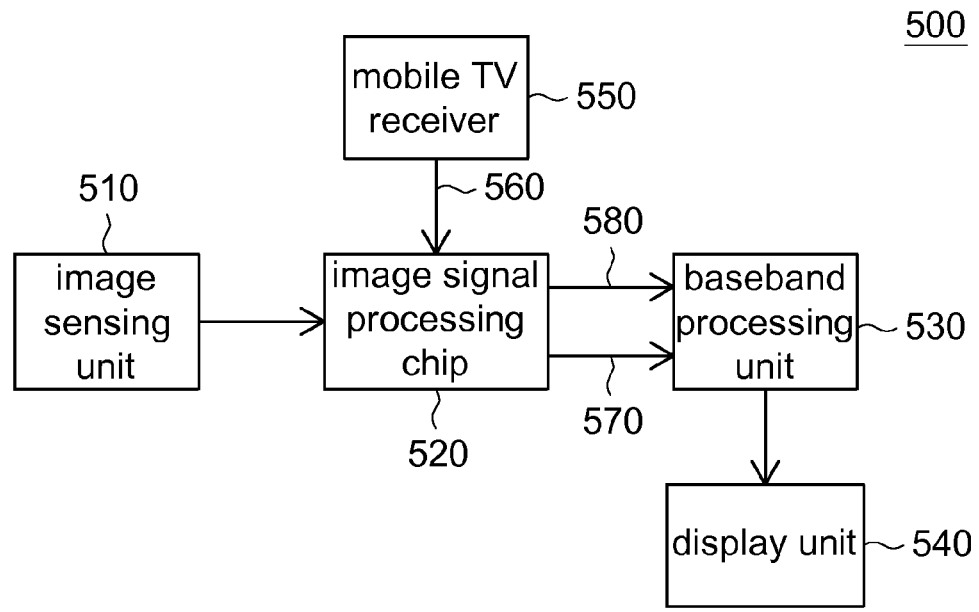
FIG. 5 shows a block diagram of a hand-held electrical communication device according to a preferred embodiment of the invention.

Referring to FIG. 5, a block diagram of a hand-held electrical communication device according to a preferred embodiment of the invention is shown. The hand-held electrical communication device 500 is exemplified by a mobile phone including an image sensing unit 510, an image processing unit 520, a baseband processing unit 530, a display unit 540 and a mobile TV receiver 550. The mobile TV receiver 550 communicates the image signal processing unit 520 via a first bus 560. The first bus 560 can be a secure digital input/output (SDIO) bus or a serial peripheral interface (SPI) bus.

Besides, the image signal processing unit 520 communicates the baseband processing unit 530 via a second bus 570 and a third bus 580 both being unidirectional. The second bus 570, such as a Consultative Committee of International Radio (CCIR) parallel bus, a standard mobile image architecture (SMIA) serial bus or a mobile industry processor interface (MIPI) serial bus, is used for transmitting a large volume of data. The third bus 580, such as an inter-IC sound (I2S) bus, is used for transmitting a digital video data.

The image sensing unit 510, such as a complementary metal oxide semiconductor (CMOS) sensor or a charge-coupled device (CCD) sensor, is used for for generating many original image frames being raw image frames. The original image frames are static images for example. The image sensing unit 510 transmits the original image frames to the image signal processing unit 520. The mobile TV receiver 550 includes a tuner and a demodulator for receiving many compressed video data and many compressed video data.

Figure 6:
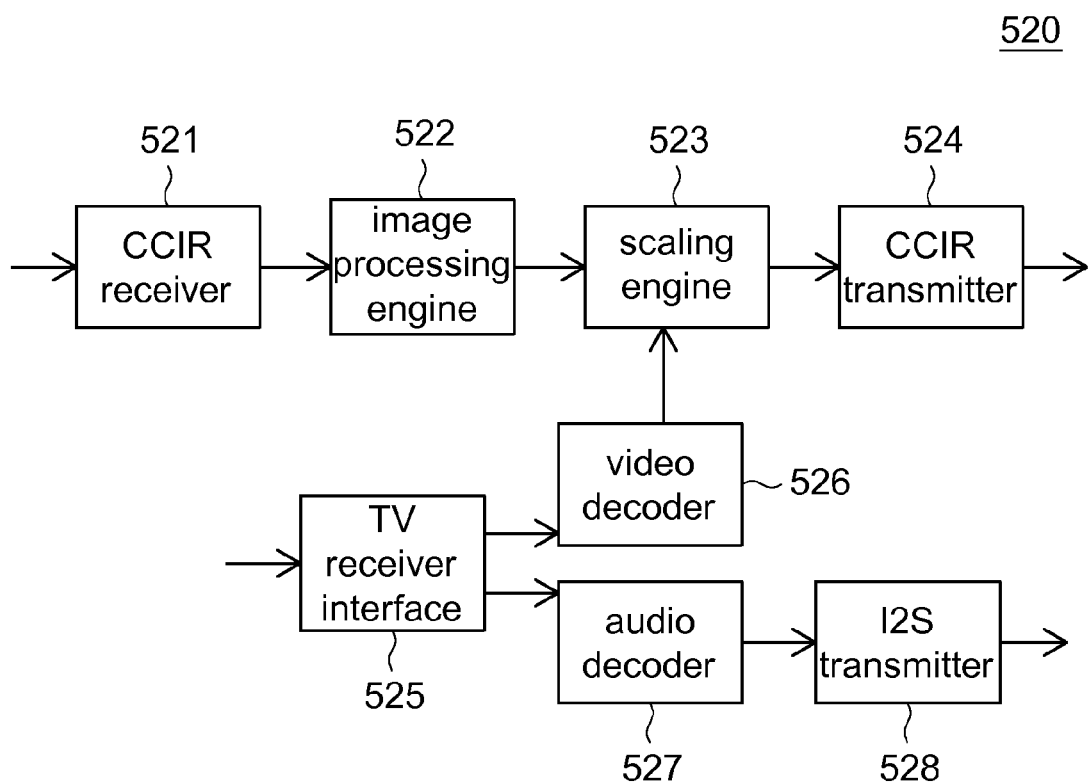
FIG. 6 shows a block diagram of an image signal processing unit according to a preferred embodiment of the invention.

The image signal processing unit 520 is an image signal processing chip for example. Referring to FIG. 6, a block diagram of an image signal processing unit according to a preferred embodiment of the invention is shown. The image signal processing unit 520 includes a CCIR receiver 521, an image processing engine 522, a scaling engine 523, a CCIR transmitter 524, a TV receiver interface 525, a video decoder 526, an audio decoder 527 and an inter-IC sound (I2S) transmitter 528. The image signal processing unit 520 uses the CCIR receiver 521 for receiving many original image frames form the image sensing unit 510 or uses the TV receiver interface 525 for receiving many compressed video data and many compressed video data from the mobile TV receiver 550 via the first bus 560.

When the CCIR receiver 521 receives many original image frames from the image sensing unit 510, the image processing engine 522 executes image processing functions such as automatic exposure, automatic white balance or automatic focusing on the original image frames so to obtain many adjusted image frames. The scaling engine 523 scales the adjusted image frames so to obtain many scaled image frames according to the resolution of the display unit 540. The scaled image frames are YUV/RGB image frames for example. The CCIR transmitter 524 outputs the scaled image frames to the baseband processing unit 530 via the second bus 570. The baseband processing unit 530 displays the scaled image frames on the display unit 540.

When the TV receiver interface 525 receives many compressed video data and many compressed audio data from the mobile TV receiver 550 via the first bus 560, the video decoder 526 decompresses these compressed video data into many video image frames, and the audio decoder 527 decompresses these compressed audio data into many audio signals. The scaling engine 523 scales the video image frame so to obtain many scaled image frames according to the resolution of the display unit 540. The scaled image frames are YUV/RGB image frames for example. The CCIR transmitter 524 outputs the scaled image frames to the baseband processing unit 530 via the second bus 570. The baseband processing unit 530 displays the scaled image frames on the display unit 540. The inter-IC sound transmitter 528 transmits the audio signals to the baseband processing unit 530 via the third bus 580. The baseband processing unit 530 outputs the audio signals to an audio device being built-in the hand-held electrical communication device 500 (not illustrated in the diagram) or an external audio device.

According to the hand-held electrical communication device 500 disclosed in the preferred embodiment of the invention, an image signal processing unit 520, equipped with a video decoder 526 and an audio decoder 527, decodes many compressed video data and many compressed audio data received by a mobile TV receiver 550. Then, a second bus 570 capable of transmitting a large volume of data and a third bus 580 capable of transmitting digital audio data are utlized for transmitting the decoded video image frames and audio signals to a baseband processing unit 530. Thus, the baseband processing unit 530 is able to display the video image frames on the display unit 540 without having to change the software architecture of the baseband processing unit 530, that is, the man-machine interface (MMI) of the baseband processing unit 530.

The invention also provided an image processing method of hand-held electrical communication device. The hand-held electrical communication device includes an image sensing unit, a mobile TV receiver, an image signal processing unit, a display unit and a baseband processing unit. The image processing method includes the following steps. The image sensing unit generates an original image frame. The mobile TV receiver receives a compressed video data. The image signal processing unit adjusts the original image frame to be an adjusted image frame or decompresses the compressed video data into a video image frame, and respectively scales the adjusted image frame or the video image frame to be a scaled image frame. The baseband processing unit displays the scaled image frame on the display unit. The principles of the image processing method of hand-held electrical communication device are already disclosed in the elaboration of the hand-held electrical communication device 500, and are not repeated here.

According to the hand-held electrical communication device and the image processing method thereof disclosed in the above embodiments of the invention, the image signal processing unit, equipped with a video decoder and an audio decoder, is able to decompress the compressed video data and the compressed audio data of the mobile TV. Then, a bus capable of transmitting a large volume of data is used for outputting the video image frames to the baseband processing unit, so that the video image frames are displayed on the display unit without having to change the software architecture of the baseband processing unit.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hand-held electrical communication device, comprising:
   an image sensing unit used for generating an original image frame;
   a mobile TV receiver used for receiving a compressed video data;
   an image signal processing unit used for adjusting the original image frame into an adjusted image frame or decompressing the compressed video data into a video image frame, and scaling the adjusted image frame or the video image frame into a scaled image frame;
   a display unit;
   a baseband processing unit used for displaying the scaled image frame on the display unit;
   a first bus; and
   a second bus, wherein
      the mobile TV receiver outputs the compressed video data to the image signal processing unit via the first bus, and the image signal processing unit outputs the scaled image frame to the baseband processing unit via the second bus;
      the mobile TV receiver is further used for receiving a compressed audio data, the image signal processing unit decompresses the compressed audio data into an audio signal and outputs the audio signal to the baseband processing unit via an inter-IC sound (I2S) bus, and the baseband processing unit outputs the audio signal to an audio device;
      the image signal processing unit includes:
         a TV receiver interface used for receiving the compressed video data from the mobile TV receiver and the compressed audio data from the mobile TV receiver;
         a video decoder used for decompressing the compressed video data into the video image frame;
         an audio decoder used for decompressing the compressed audio data into the audio signal; and
         an inter-IC sound transmitter used for outputting the audio signal to the baseband processing unit.

2. The hand-held electrical communication device according to claim 1, wherein the first bus is a secure digital input/output (SDIO) bus or a serial peripheral interface (SPI) bus, the second bus is a Consultative Committee of International Radio (CCIR) parallel bus, a standard mobile image architecture (SMIA) serial bus or a mobile industry processor interface (MIPI) serial bus.

3. An image processing method of a hand-held electrical communication device, wherein the hand-held electrical communication device comprises an image sensing unit, a mobile TV receiver, an image signal processing unit, a display unit and a baseband processing unit, and the image signal processing unit comprises a TV receiver interface, a video decoder, an audio decoder and an inter-IC sound transmitter, the image processing method comprising:
   utlizing the image sensing unit for generating an original image frame;
   utlizing the mobile TV receiver for receiving a compressed video data;
   utlizing the image signal processing unit for adjusting the original image frame into an adjusted image frame or decompressing the compressed video data into a video image frame, and scaling the adjusted image frame or the video image frame into a scaled image frame;
   utlizing the baseband processing unit for displaying the scaled image frame on the display unit;
   utlizing the mobile TV receiver for receiving a compressed audio data;
   utlizing the image signal processing unit for decompressing the compressed audio data into an audio signal and utlizing the inter-IC sound transmitter of the image signal processing unit for outputting the audio signal to the baseband processing unit via an inter-IC sound bus;
   utlizing the baseband processing unit for outputting the audio signal to an audio device;
   utlizing the TV receiver interface for receiving the compressed video data from the mobile TV receiver and the compressed audio data from the mobile TV receiver;
   utlizing the video decoder for decompressing the compressed video data into the video image frame; and
   utlizing the audio decoder for decompressing the compressed audio data into the audio signal.

4. The image processing method of hand-held electrical communication device according to claim 3, wherein the hand-held electrical communication device further comprises a first bus and a second bus, the compressed video data is outputted to the image signal processing unit from the mobile TV receiver via the first bus, and the scaled image frame is outputted to the baseband processing unit from the image signal processing unit via the second bus.

5. The image processing method of hand-held electrical communication device according to claim 4, wherein the first bus is a secure digital input/output bus or a serial peripheral interface bus, and the second bus is a Consultative Committee of International Radio parallel bus, a standard mobile image architecture serial bus or a mobile industry processor interface serial bus.

* * * * *